US006934263B1

(12) United States Patent
Seaman (10) Patent No.: US 6,934,263 B1
(45) Date of Patent: *Aug. 23, 2005

(54) SPANNING TREE WITH PROTOCOL FOR BYPASSING PORT STATE TRANSITION TIMERS

(75) Inventor: Michael J. Seaman, Mountain View, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/769,177

(22) Filed: Jan. 30, 2004

Related U.S. Application Data

(63) Continuation of application No. 09/416,827, filed on Oct. 12, 1999, now Pat. No. 6,771,610.

(60) Provisional application No. 60/116,422, filed on Jan. 19, 1999.

(51) Int. Cl.[7] .............................................. H04L 12/28

(52) U.S. Cl. ....................... 370/256; 370/254; 370/401

(58) Field of Search ................................ 370/256, 254, 370/255, 401, 408, 428; 709/238, 239

(56) References Cited

U.S. PATENT DOCUMENTS

| 5,309,437 A | 5/1994 | Perlman et al. |
| 5,606,669 A | 2/1997 | Bertin et al. |
| 5,649,109 A | 7/1997 | Griesmer et al. |
| 5,734,824 A | 3/1998 | Choi |

(Continued)

OTHER PUBLICATIONS

"Part 3: Media Access Control (MAC) Bridges," ANSI/IEEE Standard 802.1D 1998.

*Primary Examiner*—Chi Pham
*Assistant Examiner*—Keith M. George
(74) *Attorney, Agent, or Firm*—Mark A. Haynes; Haynes Beffel & Wolfeld LLP (57) ABSTRACT

Mechanisms for use on designated ports in spanning tree protocol entities allow such ports to transition to a forwarding state on the basis of actual communication delays between neighboring bridges, rather than upon expiration of forwarding delay timers. The logic that manages transition of states in the spanning tree protocol entity identifies ports which are changing to a designated port role, and issues a message on such ports informing the downstream port that the issuing port is able to assume a forwarding state. The logic begins the standard delay timer for entry to the listening state and then the learning state, prior to assuming the forwarding state. However, when a reply from the downstream port is received, then the issuing port reacts by changing immediately to the forwarding state without continuing to await expiration of the delay timer and without traversing transitional listening and learning states. A downstream port which receives a message from an upstream port indicating that it is able to assume a forwarding state, reacts by ensuring that no loop will be formed by the change in state of the upstream port. In one embodiment, the downstream port changes the state of designated ports on the protocol entity which were recently root ports to a blocking state, and then issues messages downstream indicating that such designated ports are ready to resume the forwarding state. The designated ports on the downstream protocol entity await a reply from ports further downstream. In this way, loops are blocked step-by-step through the network, as the topology of the tree settles.

6 Claims, 4 Drawing Sheets

U.S. PATENT DOCUMENTS

| | | |
|---|---|---|
| 5,761,435 A | 6/1998 | Fukuda et al. |
| 5,790,808 A | 8/1998 | Seaman |
| 5,878,232 A | 3/1999 | Marimuthu |
| 6,032,194 A | 2/2000 | Gai et al. |
| 6,044,087 A | 3/2000 | Muller et al. |
| 6,044,418 A | 3/2000 | Muller |
| 6,049,528 A | 4/2000 | Hendel et al. |
| 6,052,737 A | 4/2000 | Bitton et al. |
| 6,052,738 A | 4/2000 | Muller et al. |
| 6,061,362 A | 5/2000 | Muller et al. |
| 6,081,512 A | 6/2000 | Muller et al. |
| 6,081,522 A | 6/2000 | Hendel et al. |
| 6,088,356 A | 7/2000 | Hendel et al. |
| 6,094,435 A | 7/2000 | Hoffman et al. |
| 6,119,196 A | 9/2000 | Muller et al. |
| 6,128,666 A | 10/2000 | Muller et al. |
| 6,188,694 B1 | 2/2001 | Fine et al. |
| 6,202,114 B1 | 3/2001 | Dutt et al. |
| 6,219,739 B1 | 4/2001 | Dutt et al. |
| 6,246,669 B1 | 6/2001 | Chevalier et al. |
| 6,246,680 B1 | 6/2001 | Muller et al. |
| 6,262,977 B1 | 7/2001 | Seaman et al. |
| 6,298,456 B1 | 10/2001 | O'Neil et al. |
| 6,330,229 B1 | 12/2001 | Jain et al. |
| 6,388,995 B1 | 5/2002 | Gai et al. |
| 6,535,490 B1 | 3/2003 | Jain |
| 6,771,610 B1 * | 8/2004 | Seaman ................. 370/256 |

* cited by examiner

SPANNING TREE WITH PROTOCOL FOR BYPASSING PORT STATE TRANSITION TIMERS

RELATED APPLICATION DATA

This application is a continuation of application Ser. No. 09/416,827 filed 12 Oct. 1999 entitled *Improved Spanning Tree With Protocol For Bypassing Port State Transition Timers*, now U.S. Pat. No. 6,771,610, which claims the benefit of Provisional Application No. 60/116,422 entitled *Truncating Port State Transition Timers in the Spanning Tree Protocol for Bridged Local Area Networks*, filed 19 Jan. 1999.

The present application is related to U.S. Pat. No. 6,262,977 entitled *High Availability Spanning Tree with Rapid Reconfiguration*, issued 17 Jul. 2001, invented by Michael Seaman and Vipin Jain; is related to U.S. Pat. No. 6,330,229 entitled *Spanning Tree with Rapid Forwarding Database Updates*, issued 11 Dec. 2001, invented by Vipin Jain and Michael Seaman; and is related to U.S. Pat. No. 6,611,502 entitled *Spanning Tree with Rapid Propagation of Topology Changes*, issued 26 Aug. 2003, invented by Michael Seaman; and such patents are incorporated by reference as if fully set forth herein.

BACKGROUND OF THE INVENTION

1. Field of the Invention

The present invention relates to network protocols and network intermediate devices executing such protocols; and more particularly to algorithms for managing the tree of network devices for a data network according to a spanning tree protocol.

2. Description of Related Art

Local area networks (LANs) specified according to Institute of Electrical and Electronic Engineers (IEEE) Standards for Local and Metropolitan Area Networks under section 802.x of all types may be connected together with media access control (MAC) bridges. Bridges interconnect LAN segments so that stations connected to the LANs operate as if they were attached to a single LAN for many purposes. Thus a bridged local area network provides for interconnection of stations attached to LAN segments of different MAC types, for an increase in the physical extent, the number of permissible attachments and the total performance of a LAN, and for the partitioning of physical LAN support for administrative or maintenance reasons. The MAC bridge is specified according to the IEEE standard 802.1 D (IEEE Std 802.1D-1990, IEEE Standards for Local and Metropolitan Area Networks: Media Access Control (MAC) Bridges.) The protocol has application for establishing interconnection of devices on network segments (whether the segments are characterized as LANs or as other network constructs) in any type of network.

When a bridged network is established, it is possible to create loops in the network by providing more than one path through bridges and LAN segments between two points. Thus, according to the 802.1D standard, an active topology for the bridged network is maintained according to the spanning tree protocol which is described in the standard. The spanning tree protocol automatically establishes a fully connected (spanning) and loop-free (tree) bridged network topology. It uses a distributed algorithm that selects a root bridge and the shortest path to that root from each LAN. Tie breakers are used to ensure that there is a unique shortest path to the root, while uniqueness of the root is guaranteed by using one of its MAC addresses as part of a priority identifier.

Every LAN in the network has one and only one "designated port" providing that LAN's shortest path to the root, through the bridge of which the designated port is a part. The bridge is known as the designated bridge for that LAN.

Thus, bridges other than the root bridge at the root of the network can be termed a branch bridge. Every branch bridge has a "root port" which is the port providing that bridge's shortest path to the root. Ports other than the root port are designated ports, or alternate ports according to the standard. An alternate port is connected to a LAN for which another bridge is the designated bridge, and is placed in a blocking state so that frames are not forwarded through that port.

The frame forwarding path through any bridge is thus between its root port and designated ports. When spanning tree information has been completely distributed and is stable, this connectivity will connect all of the LANs in a loop-free tree.

When a bridge first receives spanning tree information that dictates new connectivity through that bridge, it does not establish the new connectivity immediately. Ports that were connected previously as either the root port or a designated port, but are no longer connected, are immediately made blocking. However, the transition to a forwarding state of ports that were previously not connected in a forwarding role is delayed. The delay is needed because:

(a) Frames forwarded on the previous topology may still be buffered by bridges in the network. Thus an instantaneous change to the new topology can cause these to be forwarded back to their LAN of origin, causing duplication of the frame once.

(b) New spanning tree information in the network may not have been fully distributed yet. Thus an immediate change to a new topology may cause temporary loops. These loops could generate high traffic volumes, disrupting end stations, causing frame loss in bridges, and possibly delaying the propagation of spanning tree information further.

The first of these two reasons is far less important than it once was, because the protocols prevalent on LANs today deal with immediately duplicated frames. Some old implementations of LLC type 2 will reset connection under these circumstances, but they are no longer in widespread deployment. Thus the problem presented by reason (a) is of less significance than reason (b).

Reason (b) continues to be a fundamental problem to the spanning tree configuration.

According to the spanning tree protocol of the standard, each port on a bridge can assume a blocking state in which frames are not forwarded through the port, or a forwarding state in which frames are forwarded through the port. For a transition from the blocking state to the forwarding state, the protocol requires the port to proceed through transitional states referred to as the listening state and the learning state. In the listening state, the port is preparing to participate in frame relay, however frame relay is temporarily disabled to prevent temporary loops. In the listening state, the port monitors bridge protocol data unit (BPDU) frames or other information related to the topology in the network for an interval referred to as the forward delay timer. If no information is received which causes a change in state of the port before expiry of the forward delay timer, then the port transitions to the learning state.

In the learning state, the port continues to prepare for participation in frame relay. The relay is temporarily disabled to prevent loops. In this state, in addition to monitoring BPDU frames and other information related to operation of the spanning tree algorithm, the port learns information about end stations that are accessible through the port for use in the forwarding of frames once the frame enters the forwarding state. Upon expiration of the forward delay timer in the learning state, if no better information about the protocol is received, then the port assumes the forwarding state. Thus, the transition from a blocking state to the forwarding state takes two times as long as the forward delay timer interval. From the moment of detection of a change in topology which causes a transition from the blocking to the forwarding state, until the moment that the forwarding state is assumed, can be a significant amount of time, as much as 20 to 50 seconds in some cases. Thus, when a link or switch fails, reconfiguration takes place at unacceptably slow rates for mission critical networks. Significantly reducing this recovery time remains a problem.

Three approaches to managing reconfiguration times include the following:

(1) spanning tree timer values can be manually configured for optimal values;

(2) a scheme known as "backbone fast" detects the changing topology and allows a bridge to determine whether or not connectivity in the network has been lost, by sending a test packet called a root link query PDU to the bridge in the network that is the root in the spanning tree protocol; and (3) network topologies can be specially designed to provide fail over in some cases without requiring expiration of the relevant timer, as has been described in the above cross referenced application Ser. No. 09/141,803.

Managing timers according to the first approach listed above is error prone, and negates the low administration benefits of the standard spanning tree. Further, the timers must be set to values that are a worst-case to some very high probability, so the first approach listed above provides limited improvement.

The "backbone fast" scheme of the second approach depends on a particular bridge being the root bridge, so the scheme cannot be introduced into a network by upgrading arbitrary pairs of bridges. If the network topology is changing, the root link query message to the root may not reach the actual root and cause the wrong initial steps may be taken in the effort to speed reconfiguration. Thus, the "backbone fast" scheme will speed part of the reconfiguration cycle but does not complete the entire reconfiguration unless the topology has been specially designed. Further the reconfiguration necessary may be best indicated by absence of a reply from the root, so it is necessary for the protocol to rely on some worst case estimate of the time during which a reply from the root can be expected, for managing the reconfiguration.

The third approach listed above provides a step toward a solution to the problem of reducing the recovery time of networks. The solutions described in the cross referenced U.S. patent application Ser. No. 09/141,803 allow root ports to transition to forwarding states very quickly, but still require designated ports to transition through the listening and learning states. In an arbitrary network topology, recovery of connectivity after a bridge or link failure can require a bridge port that was previously an alternate port in the spanning tree to become a designated port. Traversing the transitional states involves a delay of 30 seconds when standard default timer values are used.

Convergence of a bridged network in situations involving changing of spanning tree topology can therefore cause significant loss-of-service situations, particularly in networks that carry real time data. For example, the use of data networks and the Internet for audio and video transmissions of real time signals is increasing. Twenty to fifty second convergence times for these uses of the data network can cause unacceptable glitches. Accordingly, it is desirable to provide a technique to improve the availability of a bridged network in the face of changes in topology.

SUMMARY OF THE INVENTION

The present invention provides new mechanisms for use on designated ports in spanning tree protocol entities which allow such ports to transition to a forwarding state on the basis of actual communication delays between neighboring bridges, rather than upon expiration of worst case timers.

According to the invention, the logic that manages transition of states in the spanning tree protocol entity identifies ports which are changing to a designated port role, and issues a message on such ports informing the downstream port that the issuing port is able to assume a forwarding state. The logic in the preferred embodiment begins the standard delay timer for entry into the listening state and then the learning state, prior to assuming the forwarding state. However, when a reply from the downstream port is received, the issuing port reacts by changing immediately to the forwarding state without continuing to await expiration of the delay timer and without traversing transitional listening and learning states.

A downstream port which receives a message from an upstream port indicating that it is able to assume a forwarding state reacts by ensuring that no loop will be formed by the change in state of the upstream port. In one embodiment, the downstream port changes the state of all of designated ports that were recently root ports (e.g. designated ports which were root ports within two times the forward delay time for a typical network) on the protocol entity to a blocking state, and then issues messages downstream indicating that such designated ports are ready to resume the forwarding state. The designated ports on the downstream protocol entity await a reply from ports further downstream. In this way, loops are blocked step-by-step through the network, as the topology of the tree settles.

According to one aspect of the invention, the protocol entities include logic which manages the transition of states for a particular port changing from an alternate port role to a root port role by causing transition from the blocking state to the forwarding state without requiring satisfaction of a condition of a transitional state or states. The transitional states which are skipped in the spanning tree standard, for the alternate port transitions to the root port role, are the transitional listening and learning states.

In one embodiment, the invention provides a network device for a network comprising a plurality of local area network segments. The device comprises a plurality of ports coupled to segments in the network. Topology management resources manage the plurality of ports according to a spanning tree algorithm to set an active topology. The topology management resources include memory storing parameters for specifying the active topology. The parameters include information for identification of a root of the network, identification of a port in the plurality of ports for a root port role to be used as a path to the root, identification of one or more ports for the designated port roles to be used as paths between the root and respective segments coupled to the one or more ports, and identification of one or more ports in the plurality of ports for alternate port roles. The topology management resources also include logic to compute states for ports in the plurality of ports in response to the parameters. Ports in the root port role are placed in a forwarding state. Ports in the designated port roles are placed in a forwarding state. Ports in the alternate port roles are placed in a blocking state. The topology management resources further include logic to manage transition of states of the ports in response to the changing of the active topology, following the rules for designated ports and root ports described above.

In one embodiment, the invention is an improvement of the IEEE Standard 802.1D spanning tree protocol. Messages traded among the protocol entities in the standard, as enhanced according to present invention, are bridge protocol data units which are modified to include flags indicating that the issuing upstream port is ready to assume the forwarding role, and indicating that the issuing downstream port is ready to allow its upstream port to assume the forwarding role.

The present invention is particularly suitable for use with devices that are interconnected by point-to-point communication links. The invention may be extended to devices which are interconnected by shared media, with the addition of techniques that will allow devices which are attached to agree on the designated bridge before the transition is allowed.

The present invention allows for migration smoothly from a legacy network based on the prior art spanning tree protocol to a highly available network without significant additional administrative overhead. Thus, the spanning tree root port can be moved, and can start forwarding frames immediately if the previous root port no longer forwards frames, such as in the case of a physical link failure. Ports becoming designated move to the forwarding state based on an exchange of messages with neighboring devices. The improvement of the present invention is fully compatible with existing standard switches.

Other aspects and advantages of the present invention can be seen upon review of the figures, the detailed description, and the claims which follow.

DETAILED DESCRIPTION OF THE FIGURES

Figure 1A:
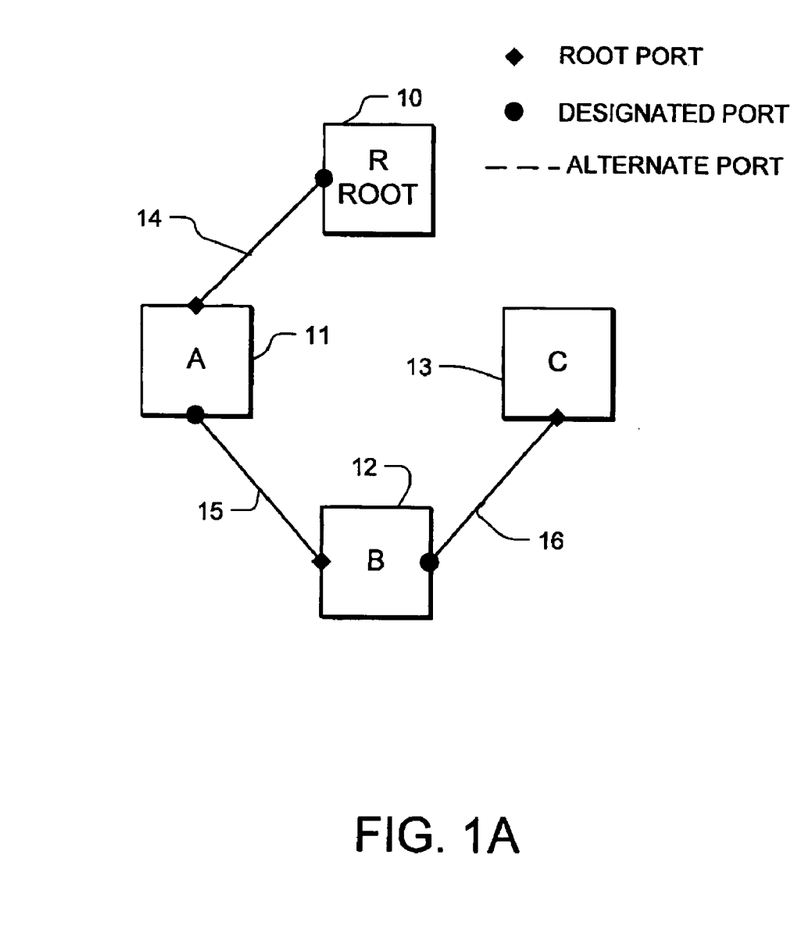
FIGS. 1A and 1B illustrate a network configuration in which the present invention is applied, before and after a spanning tree topology change.
Figure 1B:
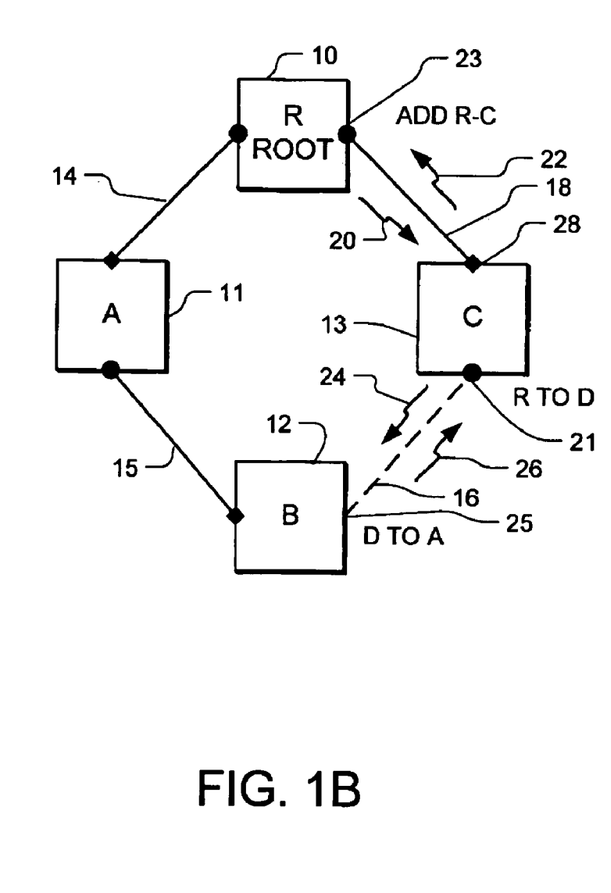

A detailed description of the present invention is provided with reference to the figures. FIGS. 1A and 1B show a simple topology in which temporary loops are prevented by the present invention. According to the topology of FIG. 1A, the network includes a network device 10 which includes a protocol entity acting as the root of the network. Device 11, device 12, and device 13 have protocol entities interconnected in a spanning tree topology with the device 10. On the link 14 between device 11 and device 10, the port on the root device 10 is in the designated port role, and port on the device 11 is in the root port role. On the link 15 between device 11 and device 12, the port on device 11 is in the designated port role and the port on device the 12 is in the root port role. On the link 16 between device 12 and device 13, the port on device 12 is in the designated port role, and the port on device 13 is in the root port role. There are no ports shown in the alternate port role in the topology shown in FIG. 1A.

FIG. 1B illustrates the actions which occur when a link 18 is added between the root device 10 and the device 13 according to the present invention. The port 23 on the root device 10 on the link 18 will assume the designated port role according to the algorithm of the present invention. First the root device 10 issues a message 20 indicating to the device 13 that it is ready to assume a forwarding state. The device 13 will receive the topology change information in the message 20, or from other messages. In response, the device 13 will change its port 21 from the root port role to the designated port role. As a result of receiving the message 20, the protocol entity in the device 13 will cause the port 21 to enter the blocking state, and then issue a return message 22 to the root device 10. When the root device 10 receives the message 22, the port 23 enters the forwarding state, establishing a connection to the device 13. The device 13 will issue a message 24 to the device 12 indicating that port 21 is ready to assume the forwarding role. In response to topology information propagated in the network, device 12 will cause the port 25 to transition to the alternate port role, and assume the blocking state. Device 12 may reply with a message 26 to the device 13 indicating that port 21 may assume the forwarding state. Since there are no designated ports on device 12, the propagation of messages stops. The protocol supports a rapid transition of the port 23 to the forwarding state, without requiring the protocol entity in the root device 10 to proceed through the listening and learning states.

In general, a designated port assumes the forwarding state immediately, provided that:

(a) the port connects to a point-to-point link (or to a shared medium for which the attached bridges have agreed on the designated bridge);

(b) the bridge at the other end of the link has selected that port as its root port, or as an alternate port (in which case the other end of the point-to-point link is "downstream" and is also not set by its protocol entity as a designated port); and (c) if the bridge at the other end of the link has recently made its port the root port, and it has made, or proposes to make, the port forwarding, then the immediately prior root port or root ports must be made blocking.

According to the process of selecting new root ports described in the co-pending U.S. patent application entitled *High Availability Spanning Tree with Rapid Reconfiguration*, which is incorporated by reference above, the prior root ports are always made blocking for point-to-point links in the normal case. Otherwise, an action is required to ensure that prior roots are made blocking upon topology changes which can invoke the present invention.

The case of FIGS. 1A and 1B, in the preferred embodiment, the root device 10 sends a configuration BPDU to the device 13 on the newly established link 18, claiming to be designated bridge for that link, and requesting a fast transition to forwarding. Next, the device 13 receives that information and agrees that root device 10 and not device 12 is the designated bridge. Device 13 then selects the link 18 as its path to the root and port 28 as its root port. Prior to issuing the message 22 notifying the root bridge 10 of the agreement, the protocol entity in the device 13 causes its prior root port 21 to transition to the blocking state. Device 13 then sends the message 22 to the root device 10 indicating that the root device can safely transition port 23 to the forwarding state. Root device 10 then receives the message and changes port 23 to the forwarding state.

Device 13 attempts to become the designated bridge for the link 16. Thus device 13 sends a properly marked BPDU 24 to the device 12. The device 12 replies with message 26, indicating to device 13 that it may proceed with changing port 21 to the forwarding state, and because device 12 has not changed its root port, port 25 is made alternate. Device 12 does not include ports changing to the designated role, nor existing designated ports surviving the topology change, so there is no further action to be done.

In the example case described, the complete topology reconfiguration is completed when the root device 10 transitions port 23 to the forwarding state in response to the message 22. This message exchange can take place in a very short interval of time—much shorter than the worst-case waiting interval of the prior art.

Figures 2, 3:
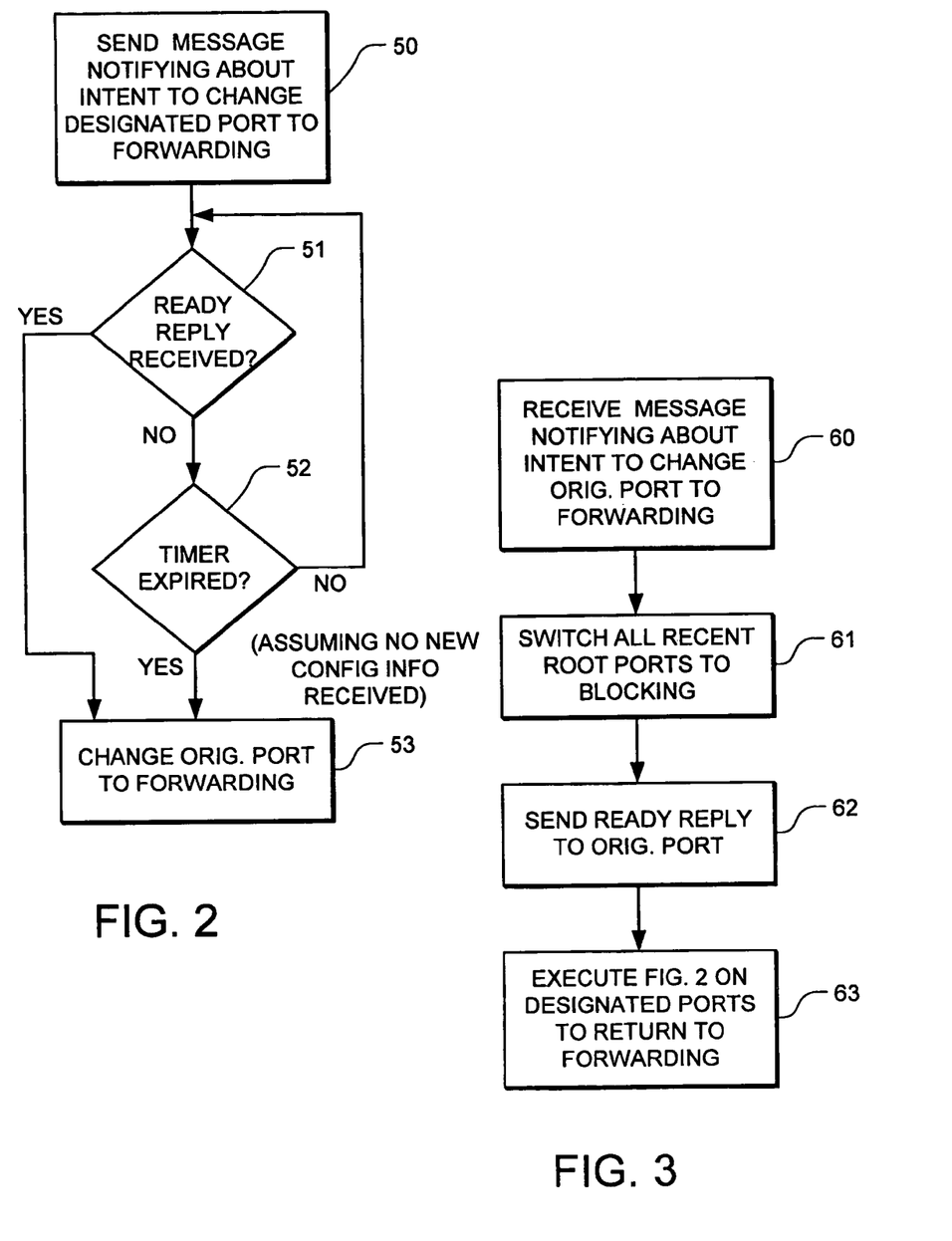
FIG. 2 is a simplified flow chart of logic executed for a port assuming the designated role according to the present invention.
FIG. 3 is a simplified flow chart of logic executed for a port downstream from a port assuming the designated role according to the present invention.

FIG. 2 provides a simplified diagram of the process executed in the root device 10 for the port 23, and more generally, for the port in the designated role for transition to the forwarding state. This diagram assumes that no new configuration information is received in the interim. The first step in the diagram is to send a message notifying a connected bridge of an intent to change the designated port to the forwarding state (step 50). After sending the message, the protocol entity waits for a reply (step 51). If no reply is received, the protocol entity determines whether the timer for the transitional listening and learning states has expired (step 52). If the timer has not expired, then the process loops to step 51. If the timer (that is, the combined timers required for transition through the listening and learning states) has expired at step 52, then the port may transition to the forwarding state (step 53). On the other hand, if a reply is received at step 51, then the port may transition immediately to forwarding state without waiting for the timers to expire.

FIG. 3 illustrates the process executed at the downstream bridge, such as the device 13 in FIG. 1B. First, a message, such as message 20, is received notifying the protocol entity about an intent to change the port which issued the message to the forwarding state (step 60). The protocol entity then switches all its designated ports, including ports assuming the designated role during the topology change, to the blocking state (step 61). When it is ensured that there are no designated ports in the forwarding state, the protocol entity issues a reply message to the originating upstream port (step 62). Next, the protocol entity executes the process of FIG. 2 on its designated ports to return the ports to the forwarding state (step 63).

The order of the steps in FIGS. 2 and 3 may be changed as suits a particular implementation.

Figure 4:
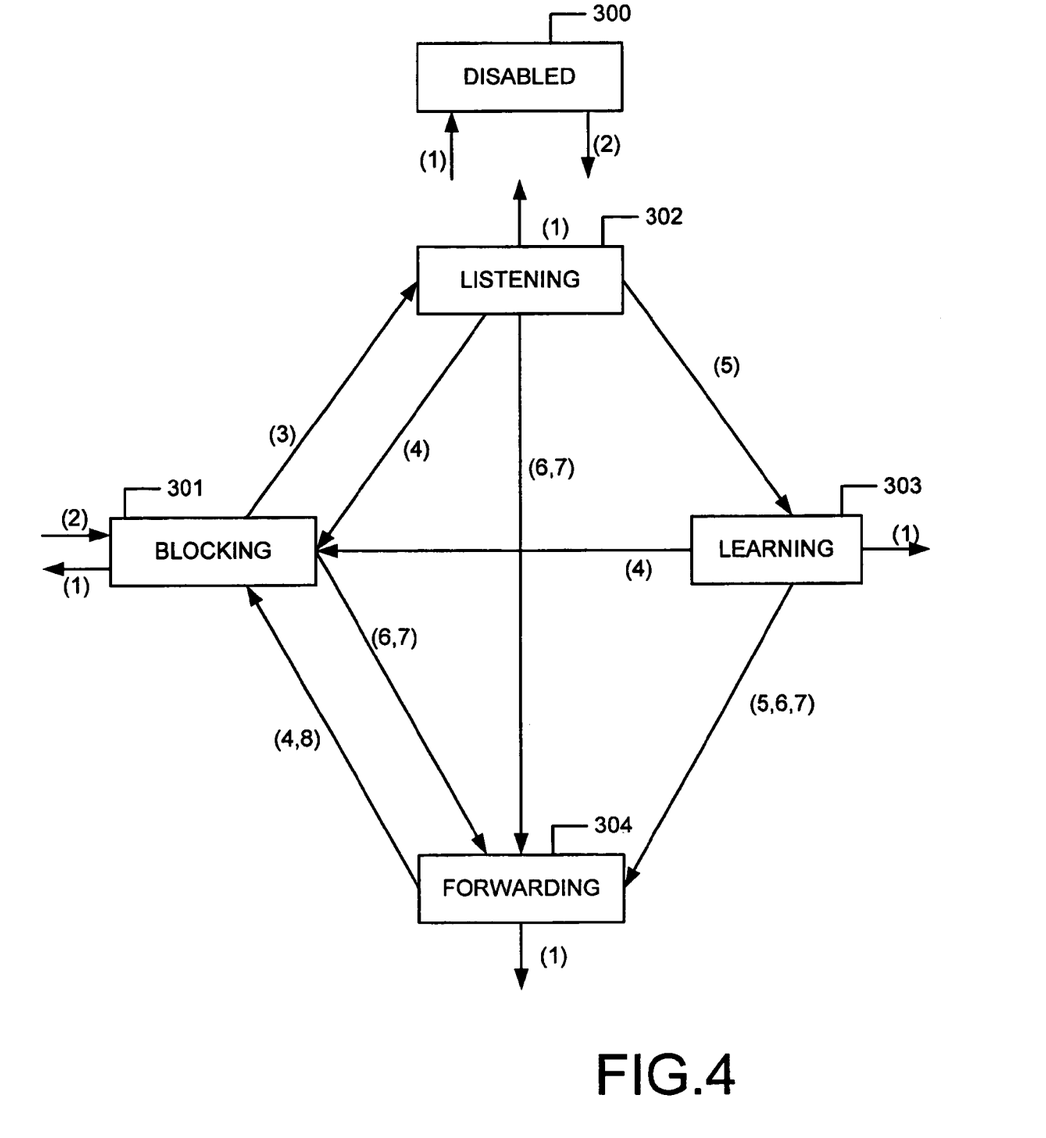
FIG. 4 is a port state diagram according to the present invention for bridged networks consisting of point-to-point segments only.

FIG. 4 illustrates the state transitions which occur according to the role to be assumed after a topology change, and the role before the topology change. Thus, in FIG. 4, the ports can assume a disabled state 300, a blocking state 301, a listening state 302, a learning state 303, and a forwarding state 304. These states behave as defined in the specification for the IEEE 802.1D standard in the preferred embodiment. Transitions from the disabled state into an active state occur on transition (2) to the blocking state 301. Transitions out of the blocking state 301 into the disabled state 300 occur on transition (1). From the listening state 302, learning state 303, or forwarding state 304, any transition to become disabled (1), causes a transition into the disabled state 300.

In FIG. 4, the transition (3) corresponds to a change in topology that requires the port to become a designated port or to become a root port, in the condition that the root port was not previously in a forwarding state prior to the change. This transition occurs from the blocking state on 301 to the listening state 302. According to the present invention, transition (7) occurs upon execution of the process of FIG. 2 when a reply message is received at step 51. This transition (7) is also allowed from the listening and learning states in various embodiments. Thus, the port may transition to the forwarding state while it is in the designated port role, without traversing the listening and learning states, with permission from a downstream device.

The transition (4) occurs when the port is to assume the alternate port role. In FIG. 4, this transition (4) occurs from any of the listening, learning or forwarding states 302–304 into the blocking state 301. The transition (5) occurs upon expiration of the forward delay timer. This transition occurs from the listening state 302 into the learning state 303, or from the learning state 303 into the forwarding state 304. The transition (6) occurs upon transition to the root port role from the alternate port role. The transition (6) occurs from the blocking, listening or learning states 301–303 into the forwarding state 304 without traversing any transitional states.

Figure 5:
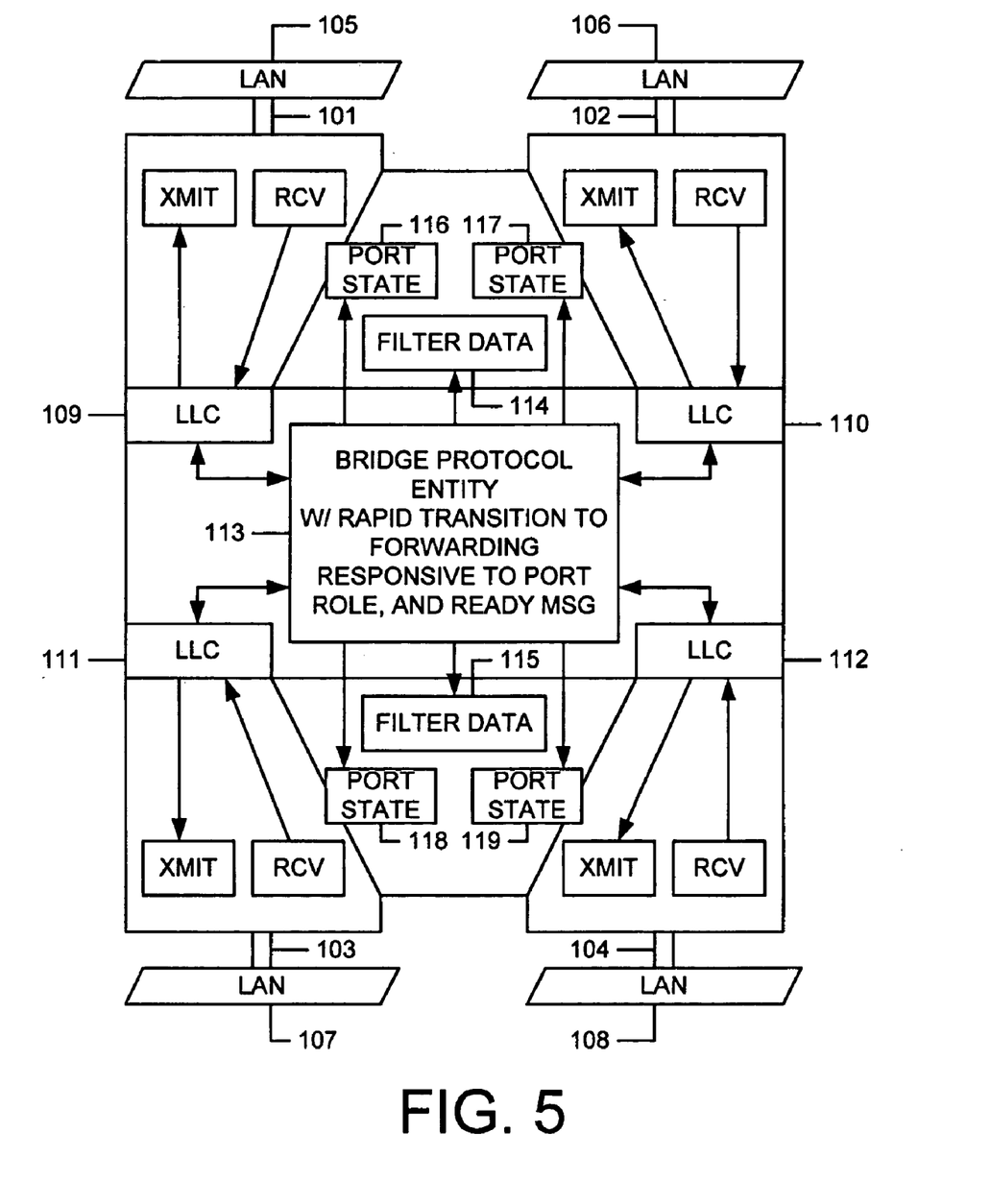
FIG. 5 is a block diagram of a bridge implementing the rapid transition to a forwarding state responsive to port role and ready messages according to the present invention.

FIG. 5 provides a block diagram of the bridge functionality in the spanning tree entities, for example, to be used in the devices of FIGS. 1A and 1B enhanced according to the present invention. FIG. 5 is drawn in the style adopted in the IEEE 802.1D standard of FIGS. 3–6, and is enhanced to provide four ports.

Thus, the bridge illustrated in FIG. 5 includes ports 101, 102, 103, and 104. Each of the ports 101–104 is coupled to a respective segment 105–108. The ports support MAC layer transmit and receive functionality. Logical link control layer (LLC) entities 109–112 provide for connection to the bridge protocol entity 113 according to the present invention. The bridge protocol entity provides memory for storing parameters that identify port roles, and for managing the transition of port state information for the plurality of ports. Furthermore, the bridge protocol entity maintains filter data 114, 115 for frames being transmitted among the ports, and port state information 116, 117, 118, and 119 for the respective ports.

Link-up monitors 125–128 are included for each port, which signal loss-of-light or loss-of-link beat situations to the protocol entity, which can trigger topology changes according to the present invention very quickly.

The protocol entity of FIG. 5 includes memory that stores parameters that specify the active topology. The parameters identify a root of the network, a port for a root port role to use for a path to the root, and one or more ports in the plurality of ports as designated port roles. Also, ports in the alternate port role are identified by parameters stored in the memory. For a port changing from the alternate port role to a designated port role, logic executes the processes of FIGS. 2 and 3, causing rapid transition to the forwarding state which bypasses the transitional states, or alternatively, causing a transition from the blocking state to a transitional state, including the listening and learning states 302, 303, prior to transition into the forwarding state 304. For a port changing from the alternate port role to the root port role, the logic causes transition directly from the blocking state to the forwarding state without requiring satisfaction of the conditions of the transitional state.

For the case in which there are more than one alternate ports, the protocol entity stores information identifying a next root from among the ports in the alternate role. For example, the next root can be specified as the port in the alternate role having the lowest cost root to the root of the network.

The present invention allows the transition of a designated port to the forwarding state to happen much more quickly than was possible in the prior art. The invention is particularly advantageous for networks based on point-to-point links, as is common in the core of most switched networks today. It is also advantageous for any spanning tree configured communication system, including network operating with system bus protocols, wide area network protocols, and other protocols. The acting port sends a message to the partner protocol entity attached to its link. The message informs the partner of the actor's ability to transition to the forwarding state rapidly, and requests permission to do so. If the partner, having processed spanning tree configuration information received from the actor and from other ports, agrees that the actor should be the designated bridge, then the partner sends back that permission. If the port on the partner protocol entity is to be in the blocking state, that is, the port will be an alternate port, then no further action needs to be taken by the partner bridge. Otherwise, if the partner port is to become a root port, and is not already, then the partner protocol entity changes its prior root port to the blocking state before the permission is sent back. This change is also done if the partner port has become the root port recently. If the partner protocol entity changes its prior root port to the blocking state, but that prior root port is to be a designated port according to the topology, then the partner protocol entity repeats the procedure, asking its downstream partner on the link for permission to transition to the forwarding state rapidly.

Thus, a "cut" in the active topology is made to prevent loops, and is moved by this procedure hop-by-hop to its final port as determined by stable spanning tree information. At each hop, one protocol entity changes its designated port to a forwarding state while the next bridge further from the root of the network may transition its prior root port, now possibly a designated port, to blocking temporarily before repeating the process. The hop-by-hop movement of the port that is blocking to prevent loops is delayed only by the actual time required by one bridge to transmit a message to the other bridge and for the other bridge to send a reply. This message exchange can take place much more quickly than the prior art timers based on some worst case estimate of the network delay.

In one embodiment, the messages are added to spanning tree configuration BPDUs as flags, or as an alternate encoding. This approach preserves interoperability with bridges not implementing this improvement. While it is not the only way of sending messages, this use of regular spanning tree BPDU messages has the advantage that the permission request will be continuously repeated as part of the normal BPDU protocol. The normal protocol guards against lost messages and ensures that other spanning tree information normally carried in such BPDUs is received at the recipient along with the permission request.

The foregoing description of a preferred embodiment of the invention has been presented for purposes of illustration and description. The description is not intended to be exhaustive or to limit the invention to the precise forms disclosed. Many modifications and variations will be apparent to practitioners skilled in this art. It is intended that the scope of the invention be defined by the following claims and their equivalents.

What is claimed is:

1. For a network comprising a plurality of network segments, a network device comprising:
   a plurality of ports coupled to segments in the network; and
   topology management resources which manage the plurality of ports according to a spanning tree algorithm, to set an active topology for the plurality of ports; including
   memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective segments coupled to the one or more ports, and identification of one or more ports in the plurality of ports for alternate port roles;
   logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and
   logic to manage transition of the states of the ports in the plurality of ports in response to a change in the active topology, including for a port changing to a designated port role, issuing a message informing a recipient that the port is able to change to a forwarding state, and then upon receipt of a ready signal from the recipient, causing a transition to the forwarding state.

2. The network device of claim 1, wherein the logic to manage transition of states includes logic for a particular port changing from the alternate port role to the root port role causing transition from the blocking state to the forwarding state without requiring satisfaction of a condition of a transitional state.

3. For a network comprising a plurality of network segments interconnected by network devices according to an active topology established by a spanning tree protocol which provides at network devices a protocol entity managing a plurality of ports according to a blocking state, at least one intermediate state and a forwarding state, an improvement comprising:
   storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective segments coupled to the one or more ports, and identification of one or more ports in the plurality of ports for alternate port roles; and
   for a particular port changing to the designated port role, issuing a message on the particular port informing a recipient that the particular port is able to change to a forwarding state, and then upon receipt of a ready signal from the recipient, causing transition from the blocking state to the forwarding state without requiring transition through the intermediate state.

4. The improvement of claim 3, including for a particular port changing from the alternate port role to the root port role causing transition from the blocking state to the forwarding state without requiring transition through the intermediate state.

5. The improvement of claim 4, including information to identify one of the one or more ports having the alternate port role as a next root, and in response to detection of a failure of the root port, causing the alternate port identified as the next root to transition from the blocking state to the forwarding state.

6. The improvement of claim 3, wherein the spanning tree protocol comprises a protocol compliant with IEEE Standard 802.1D.

* * * * *